United States Patent [19]
Pollard

[11] 3,832,619
[45] Aug. 27, 1974

[54] CONTROL MEANS WITH REDUNDANT OSCILLATORS AND A SPECIAL STARTING SCHEME FOR PERIODICALLY FIRING ELECTRIC VALVES

[75] Inventor: Ernest M. Pollard, Cherry Hill, N.J.
[73] Assignee: General Electric Company, Philadelphia, Pa.
[22] Filed: July 30, 1973
[21] Appl. No.: 383,899

[52] U.S. Cl............................ 321/5, 321/19, 321/40
[51] Int. Cl. ........................................... H02m 7/20
[58] Field of Search.................. 321/5, 19, 27 R, 40

[56] References Cited
UNITED STATES PATENTS

| | | | |
|---|---|---|---|
| 3,582,755 | 6/1971 | Liss et al................................. | 321/5 |
| 3,644,820 | 2/1972 | Ainsworth......................... | 321/19 X |
| 3,746,966 | 7/1973 | Torok et al....................... | 321/40 X |
| 3,766,464 | 10/1973 | Reeve.................................... | 321/5 |
| 3,766,465 | 10/1973 | Reeve.................................... | 321/5 |
| 3,771,041 | 11/1973 | Chadwick............................. | 321/5 |

*Primary Examiner*—William M. Shoop, Jr.
*Attorney, Agent, or Firm*—J. Wesley Haubner; Albert S. Richardson, Jr.

[57] ABSTRACT

In an electric power delivery system, a plurality of controllable electric valves which are arranged in a bridge configuration are respectively fired in a predetermined sequence by a family of individual firing signals. At least three redundant frequency modulated oscillators and a distributor are used for cyclically generating the firing signals in timed relation to the alternating voltage of the power system. Each of the oscillators produces a train of discrete pulses at a frequency which normally is a predetermined harmonic of the system frequency, and the distributor includes voting logic means which enables a firing signal to be produced in the event of a coincidence of discrete pulses from any two of the oscillators. Concurrently with the commencement of each firing signal, all of the oscillators are simultaneously recycled. A special scheme is provided for starting the firing signal generator in step with system voltage so that the initial firing signal is associated with a predetermined one of the valves and is characterized by a known firing angle of desired value.

23 Claims, 5 Drawing Figures

CONTROL MEANS WITH REDUNDANT OSCILLATORS AND A SPECIAL STARTING SCHEME FOR PERIODICALLY FIRING ELECTRIC VALVES

This invention relates to means for generating periodic signals useful for firing the electric valves of static power converters, and more particularly it relates to improvements in the manner of starting and in the reliability of such signal generating means in a high-voltage converter of the kind that can be operated alternatively as either a rectifier (converting a-c to d-c) or an inverter (converting d-c to a-c) in an HVDC electric electric power delivery system.

A static power converter suitable for HVDC power delivery systems comprises the combination of a polyphase power transformer and at least one group of six interconnected electric current conducting valves. Each of the valves can be a single mercury arc tube, or a plurality of semiconductor cells such as thyristors that are operated in unison. Typically the valves are arranged in three-phase and double-way six-phase bridge configurations having three separate a-c terminals and a pair of positive and negative d-c terminals. By sequentially firing the respective valves in the proper order and in synchronism with the sinusoidal alternating voltage of the three-phase electric power network to which the a-c terminals of the bridge are connected, the flow of power between the a-c and d-c terminals can be controlled as desired.

The time at which a valve is fired, measured in electrical degrees from a recurrent reference point in each cycle of the associated voltage, is known as the "firing angle." It can be expressed either as an angle of delay ("alpha") after the positive-going zero crossing of the anode voltage of the valve, or as the complementary angle of advance ("beta") prior to the cyclically recurring instant at which the anode voltage waveform would have crossed zero and gone negative relative to the cathode if the valve had not been fired. Hereinafter the firing angle will be referenced to the latter instance, it being understood that a beta of $\beta$ degrees corresponds to a delay angle of $180° - \beta$. When beta is $180°$ (alpha = 0), the average magnitude of the rectified voltage between the d-c terminals of the converter has its maximum positive level, and the converter is able to deliver power from the a-c network to a load on its d-c side. As beta is decreased from $180°$ to approximately $90°$, the average d-c voltage decreases to zero. For betas in the range of $90°$ to zero, the average d-c voltage reverses polarity (i.e., the potential on the nominal positive terminal is relatively negative), and the bridge operates in its inverting mode whereby power can be transmitted from a source on the d-c side of the converter to the a-c network.

To fire an individual valve, its control grid or gate has to be activated by an appropriate trigger signal or gate pulse which is periodically applied thereto. A converter will therefore include suitable means for cyclically producing a series of gate pulses to fire its valves in the proper sequence and at the desired firing angle. Ordinarily the control means comprises a firing signal generator whose operation determines the timing of the gate pulses and hence the firing angle of the respective valve firings. The firing signal generator performs the function of a firing time computer.

In accordance with modern practice in the art, the firing signal generator will include a voltage-controlled oscillator which normally runs at an harmonic (e.g., sixth or twelfth) of the fundamental frequency of the alternating voltage to drive a distributor which cyclically generates a family of equidistantly spaced individual firing signals for respectively initiating the aforesaid gate pulses. The frequency of the oscillator varies with the magnitude of a frequency determining signal which in turn is controlled by an associated regulator. If there is an error between system response and a given order, the regulator reacts by increasing or decreasing the oscillator frequency so as transiently to vary the frequency of the valve firings relative to the frequency of the alternating voltage until the firing angle has varied or shifted to the correct value for zero error, whereupon the frequency determining signal resumes its normal magnitude and frequency of the firing signals is again locked to the frequency of the alternating voltage. Appropriate firing angle limits are provided to prevent the firing angle of the valves from slipping outside of a certain range of permissible values. An improved form of such firing means is disclosed in my copending U.S. patent application Ser. No. 382,015 filed on July 23, 1973, and assigned to the General Electric Co.

When such a firing signal generator is used to control a high-voltage converter in an electric power delivery system where any power outages due to failures in the conversion circuits or controls can have very serious economic consequences, high reliability is of utmost importance. Accordingly, a general objective of the present invention is to provide a firing signal generator of the type summarized above that is characterized by improved reliability.

Another object of my invention is to provide improved method and apparatus for starting such a firing signal generator in synchronism with the alternating voltage of the a-c network to which the converter is connected.

In carrying out my invention in one form, a polyphase alternating voltage network and a set of d-c power conductors are interconnected by a static converter comprising a plurality of periodically conducting controllable electric valves and control means for cyclically firing the valves in a predetermined sequence and at a frequency that can be varied relative to the frequency of the alternating voltage in order to vary the firing signal of the respective valve firings. The control means comprises a plurality of frequency modulated oscillators which are respectively operative to produce a plurality of trains of discrete pulses. Each train has a pulse frequency of $f$ Hertz which varies with the magnitude of a variable signal supplied to the respective oscillators, and $f$ will be a predetermined harmonic of the fundamental frequency of said alternating voltage whenever the variable signal has a predetermined normal magnitude. The control means also comprises a distributor responsive to said pulse trains for producing during each cycle of alternating voltage and a family of N individual firing signals which activate suitable means for firing the respective valves of the converter in sequence. Thus each valve is fired at a frequency of $f/N$. The distributor includes voting logic means connected to all of the oscillators for causing each firing signal in turn to commence whenever there is a coincidence of discrete pulses from any two of the oscillators, and concurrently with the commencement of each firing signal the distributor effects simultaneous recycling of all of the oscillators. By using three or more oscillators in the above-summarized control means, highly reliable operation is assured because the failure of any one of the oscillators will not interrupt the generation of firing signals. By simultaneously recycling all of the oscillators as described, they are normally kept running in contact with one another and the failure of one does not appreciably affect the timing of the firing signals produced just after the failure compared to before.

In one aspect of my invention, a special scheme is provided for starting or restarting the firing signal generator after being out of service for any reason so that the initial firing signal produced on starting will be properly synchronized with the alternating voltage of the polyphase network. Stated in process terms, the starting scheme comprises the steps of deriving from the network a periodic timing signal which recurs at a predetermined reference point in each cycle of alternating voltage, initially blocking the operation of all of the oscillators in such states that they will produce discrete pulses as soon as unblocked, and subsequently unblocking the oscillators in response to the first occurrence of the aforesaid timing signal after a predetermined start command is received. As a further step in the starting process, the distributor is initially locked in a preset pattern in readiness to produce an initial firing signal for a predetermined one of the valves, and the distributor is subsequentially unlocked when the start command is received. Apparatus for carrying out this method is disclosed hereinafter.

My invention will be better understood and its various objects and advantages will be more fully appreciated from the following description taken in conjunction with the accompanying drawings in which.

Figure 1:
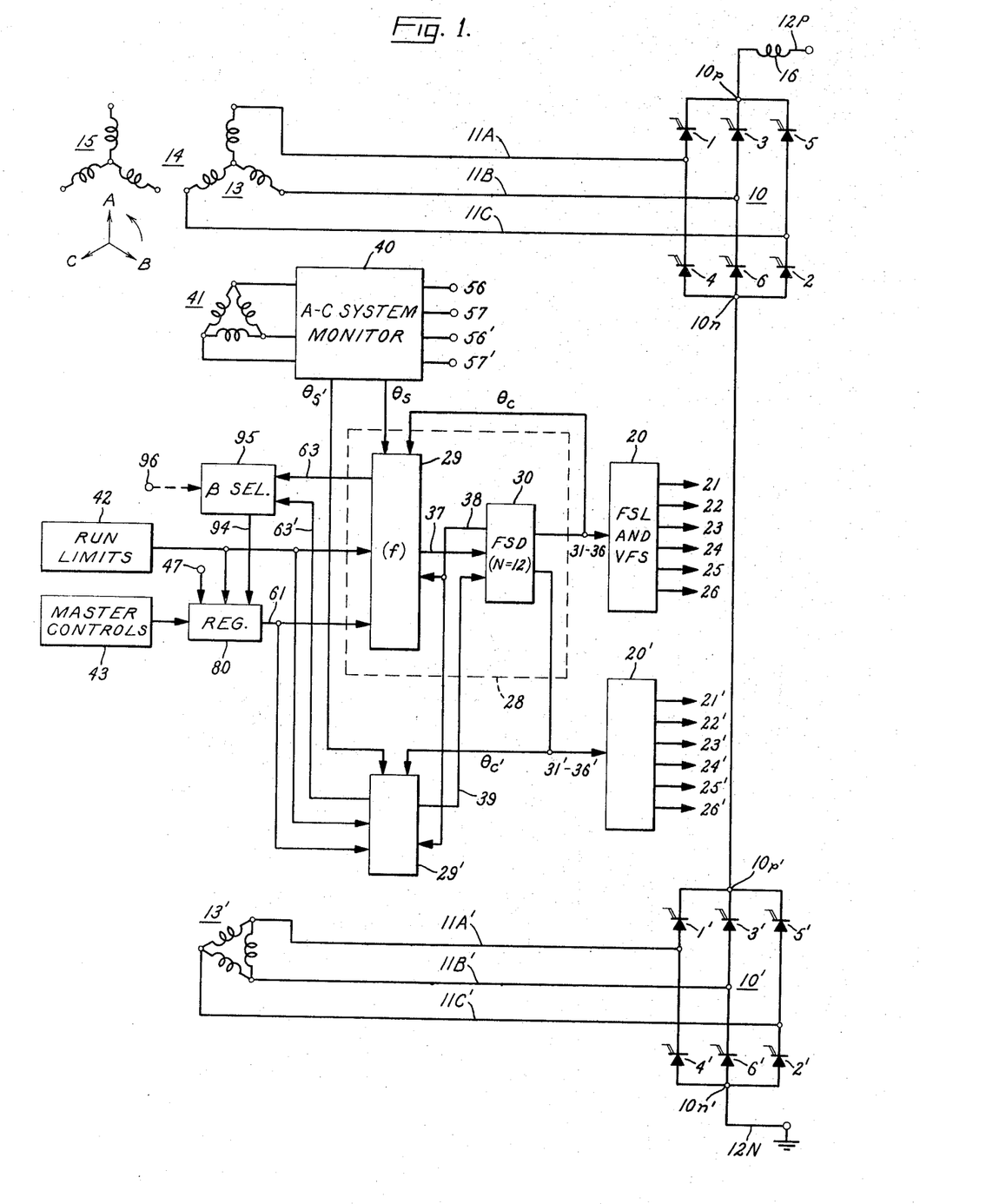
FIG. 1 is a functional block diagram of a static power converter the controls of which include a firing signal generator that embodies my invention.

Referring now to FIG. 1, the illustrated converter is seen to comprise twelve periodically conducting controllable electric valves which are arranged in two groups or bridge configurations. Half of the valves 1, 2, 3, 4, 5, and 6 are interconnected to form a first three-phase double-way six-pulse bridge 10 having a set of a-c terminals which are respectively connected to three separate a-c power conductors 11A, 11B, and 11C and having a pair of d-c terminals 10$p$ and 10$n$. The odd-numbered valves 1, 3, and 5 have their cathodes connected in common to the d-c terminal 10$p$ and their anodes connected respectively to conductors 11A, 11B, and 11C, while the even-numbered valves 4, 6, and 2 have their anodes connected in common to the other d-c terminal 10$n$ and their cathodes connected respectively to conductors 11A, 11B, and 11C. The three a-c conductors are in turn connected to the star-connected secondary windings 13 of a main power transformer 14 whose three-phase primary 15 is adapted to be connected to a set of power conductors comprising the respective phases of a polyphase a-c electric power network (not shown). The alternating voltages of the a-c network have a predetermined fundamental frequency (e.g., 60 Hz) and a phase rotation of A, B, C.

The other group of valves 1', 2', 3', 4', 5', and 6' is arranged in a second six-pulse bridge configuration 10' which is similar to the bridge 10. However, the alternating voltages on the a-c conductors 11A', 11B', and 11C' to which the a-c terminals of the bridge 10' are respectively connected are phase displaced 30 electrical degrees with respect to the alternating voltage connections of the bridge 10, thereby forming a 12-pulse converter. This is accomplished by connecting the conductors 11A', 11B', and 11C' to an additional set of delta-connected secondary windings 13' which are inductively coupled to the primary 15 of the main power transformer 14. The d-c terminals 10$p'$ and 10$n'$ of the second bridge 10' are connected in series with the corresponding terminals of the first bridge to a set of d-c power conductors 12P and 12N. More specifically, the nominal negative terminal 10$n'$ of the bridge 10' is connected to the d-c conductor 12N either directly or, if desired, via the d-c terminals of one or more additional six-pulse bridges connected in series with those shown. The nominal positive terminal 10$p'$ of the bridge 10' is connected directly to the negative terminal 10$n$ of the companion bridge 10. The nominal positive terminal 10$p$ of the latter bridge is connected to the other d-c conductor 12P by way of a conventional current smoothing reactor or choke 16.

The converter that is shown in FIG. 1 is intended to be part of one pole of a terminal or station of a power delivery system which can transmit high voltage direct current (HVDC) over the conductors 12P and 12N between the a-c network to which the transformer primary 15 is connected and another network to which the remote ends of these d-c conductors are coupled. Ordinarily there is another converter terminal (not shown) located between the remote end of the d-c link and the other a-c network. In this setting each of the six controlled valves in each bridge of the system must necessarily be capable of periodically blocking high voltages and conducting high currents. Toward that end, each valve preferably comprises a series string of parallel arrays of individual thyristors which are suitably arranged for switching and conducting effectively in unison. See for example U.S. Pat. No. 3,423,664—Dewey. Each of the constituent thyristors of a valve has its own gating means, and in order to turn on or to fire the valve suitable means is provided for simultaneously activating the gating means of all of its thyristors in response to a trigger signal being applied to the valve by associated controls.

The control means for the bridge 10 includes a valve firing system 20 which repetitively produces a series of appropriate trigger signals 21–26 and which sequentially applies these signals to the six valves 1–6 in numbered order. In FIG. 1 the valve firing system 20 is illustrated as a single block that is intended also to include a firing signal logic function. The valve firing system 20 is suitably designed to produce the trigger signals 21–26 in turn when activated by periodic output signals of a firing time computer 28. The firing time computer 28, during each cycle of the transformer secondary voltages, generates and distributes to the valve firing system a family of six staggered output pulses 31–36 (herein referred to as firing signals). The individual firing signals respectively commence at intervals of 60 electrical degrees, and it is their timing relative to the zero crossings of the alternating voltages on the conductors 11A, 11B, and 11C that determines the firing angle of the valves 1–6. By varying this firing angle, the direction and amount of power flowing between the a-c and the d-c conductors can be controlled in a known manner.

The firing time computer 28 is suitably constructed and arranged to vary within prescribed limits, the timing of the family of individual firing signals relative to the zero crossings of the alternating voltages so that the actual direction and quantity of power will conform to a given power order. Toward this end, operation of the firing time computer 28 is affected by several interdependent inputs. As is shown in FIG. 1, one of the inputs is a periodic feedback signal $\theta_c$ which marks the initiation of successive valve firings in the bridge 10. Another input is a periodic reference signal $\theta_s$ which is synchronized with the fundamental sinusoidal voltage waveform of the power system. This reference signal is derived from the a-c network by means of an a-c system monitor 40 which is coupled to the power conductors 11A, 11B and 11C by suitable means such as tertiary windings 41 of the main three-phase power transformer 14. Other inputs to the firing time computer are supplied by a block 42 labeled "run limits" and by a regulator 80 which in turn receives power orders from the master controls 43 and system responses from a feedback terminal 47.

In the firing time computer 28 there is means 29 for producing a train 37 of relatively high frequency pulses and a distributor 30. The pulse frequency of the train 37 is controlled by a variable bipolar input signal 61 whose source is the regulator 80; in steady state operation this input signal is zero and the pulse frequency is a predetermined harmonic (e.g., 12th) of the normal fundamental frequency (e.g., 60 Hz) of the alternating voltage of the a-c network. During each cycle of alternating voltage the distributor 30 responds to a schedule of alternate pulses in this train by sequentially producing at 60-degree intervals the individual firing signals 31–36 which activate in turn the previously described valve firing system 20. Timing of the start of each firing signal is characterized by the electrical angle $\beta$ which is referenced to the negative-going zero crossing of the phase-to-phase voltage that forward biases the associated valve just prior to its firing (which voltage is also known as the commutating voltage of the valve whose conduction will be relieved upon firing the valve associated with that firing signal). So long as the pulse train 37 has the aforesaid harmonic frequency, each of the six firing signals 31–36 recurs at a frequency equal to the fundamental frequency of the alternating voltage of the a-c network, and consequently the magnitude of $\beta$ is then constant. If the pulse frequency were transiently increased or decreased, the firing signal frequency would be correspondingly raised or lowered relative to the a-c frequency, thereby advancing or retarding $\beta$ at a rate that depends on the amount of frequency difference.

For controlling the 12-pulse converter that is illustrated in FIG. 1, the distributor 30 in the firing time computer 20 is arranged to generate two families of interleaved firing signals. The second family comprises six individual firing signals 31'–36' for the respective valves 1'–6' of the second bridge 10', and it is phase displaced by 30° with respect to the first family 31–36. The firing signals 31'–36' of the second family are fed to a valve firing system 20' which responds thereto by cyclically producing an appropriate sequence of trigger signals 21'–26' for respectively firing the valves 1'–6' in numbered order. Thus the distributor 30 produces during each cycle of alternating voltage a composite family of twelve individual firing signals which alternatively activate the two valve firing system 20 and 20' for firing the respective valves of the converter in the following sequence: 1, 1', 2, 2', 3, 3', 4, 4', 5, 5', 6, and 6'. Thirty degrees after initiating the 12th firing signal 36', the distributor repeats the first firing signal 31. In this manner each valve in the converter is cyclically fired at a frequency which is one-twelfth the frequency ($f$) of the pulse train 37. Normally $f$ is 12 times the fundamental frequency of the alternating voltage of the a-c network.

In accordance with the present invention, the firing signal distributor 30 is supplied with redundant pulse trains. For this purpose, the controls shown in FIG. 1 include another pulse train producing means 29' which is essentially a duplicate of the means 29. It has inputs corresponding to those supplied to the means 29, and it produces a second train 39 of pulses having the same high frequency as the train 37. The two pulse trains 37 and 39 are supplied to a voting logic circuit in the distributor 30. To keep the means 29 and 29' operating in concert with one another, both are simultaneously recycled by a feedback signal 38 which is issued by the distributor concurrently with the commencement of each firing signal. Circuits useful for accomplishing these results are shown in FIGS. 2 and 3 and will soon be described.

As was mentioned hereinbefore, the pulse frequency $f$ of the train 37 (and also of the train 39) is controlled by the bipolar input signal 61 from the regulator 80. The regulator 80 can utilize the mode selector scheme which is the subject matter of my copending U.S. patent application Ser. No. 382,724 filed on July 26, 1973, and assigned to the General Electric Co. One advantageous mode of regulation, as is taught in my previously referenced application Ser. No. 382,015, is to regulate beta to a desired constant value which is determined by a preset limit (either maximum or minimum) thereof. In this case, the magnitude and the relative polarity of the input signal 61 will depend on the difference, if any, between the actual value of a valve firing angle and the predetermined limit thereof, and th frequency of the valve firings is varied from normal until this difference is reduced to minimum. To provide an indication of the firing angle, the regulator 80 is supplied with a response or feedback signal 94 which has a typical value determined by a beta selector 95 from among a plurality of firing angle feedback signals 63, 63', and 96. The angle feedback signal 63 is produced by a beta monitor in the means 29 of the firing time computer 28, the signal 63' is produced by a duplicate beta monitor in the redundant means 29', and the other angle feedback signals 96 are produced by additional redundant monitors.

Figure 2:
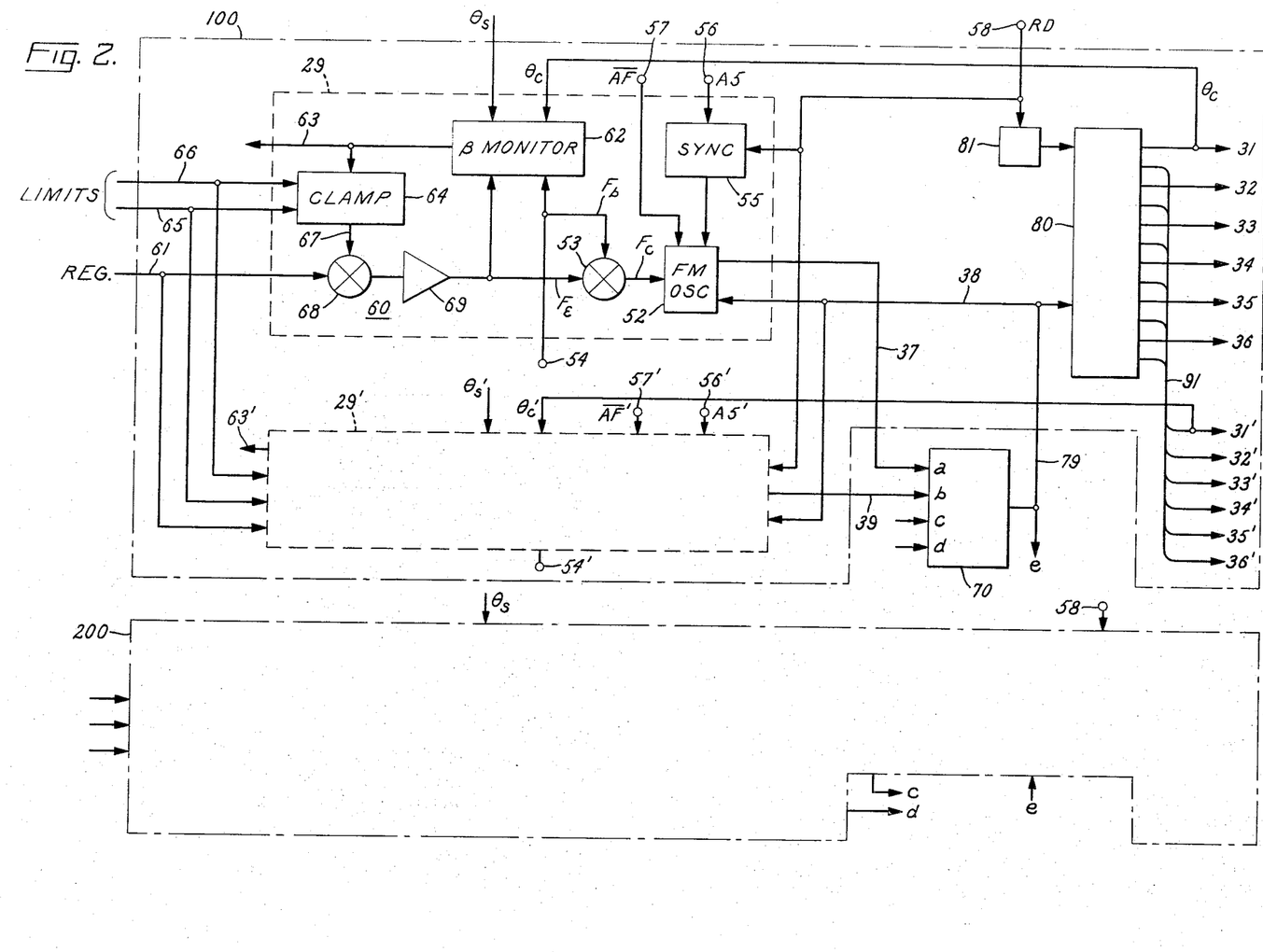
FIG. 2 is an expanded schematic diagram of the firing signal generator shown in FIG. 1.
Figure 3:
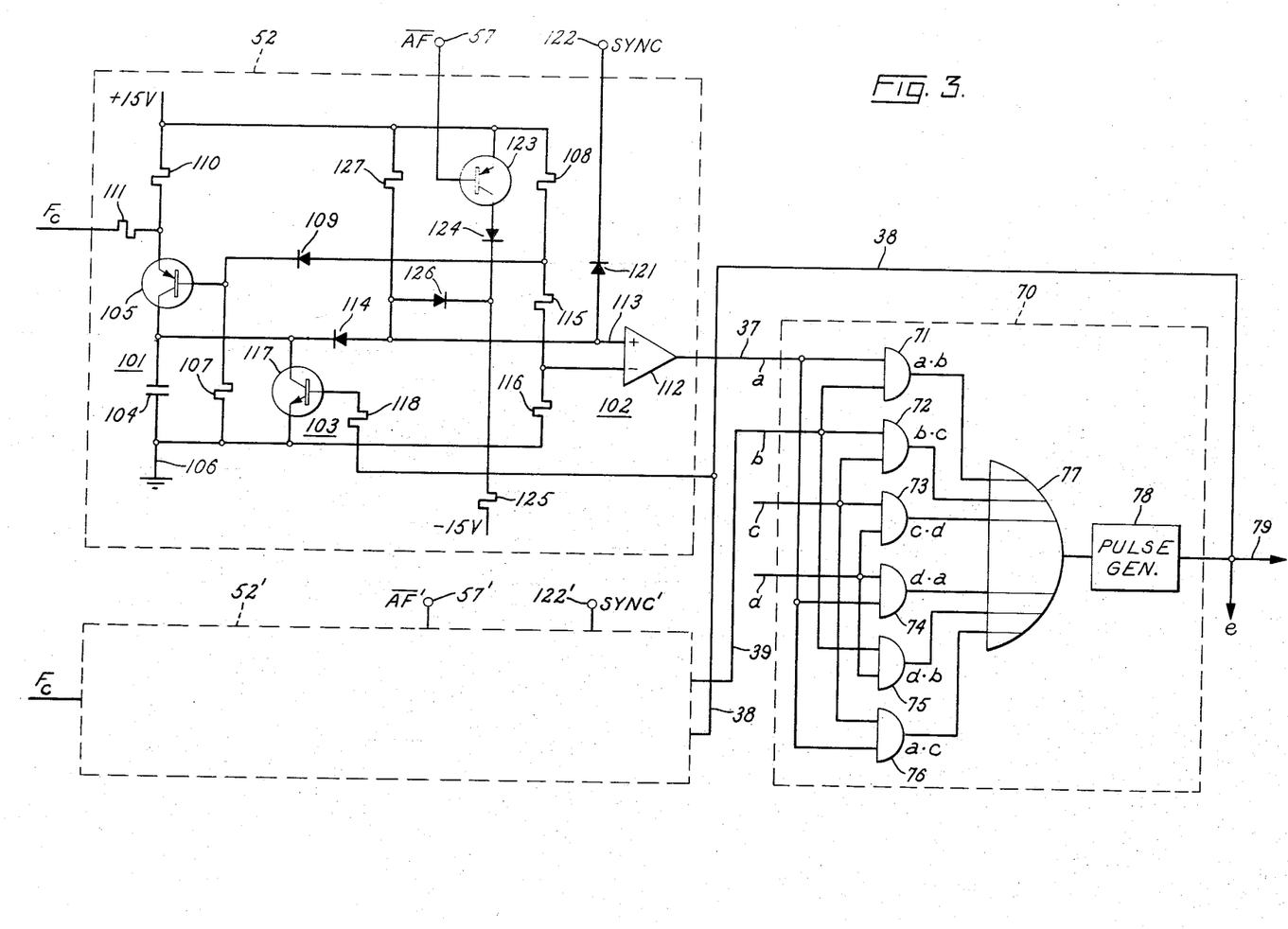
FIG. 3 is a schematic circuit diagram of preferred embodiments of the frequency modulated oscillators and the voting logic means shown in block form in FIG. 2.

The firing time computer 28 is shown in greater detail in FIG. 2 where it is seen to include means 60 for deriving a variable bipolar control signal $F_4$ from the input signal 61. The control signal deriving means 60 comprises a beta monitor 62 for producing an angle feedback signal 63 whose magnitude is representative of β, an overriding clamp 64 for comparing the angle feedback signal 63 with preset minimum and maximum limits 65 and 66, respectively, and for supplying a limit signal 67 proportional in magnitude to the amount of any deviation of β outside a range of permissible variations that these limits establish, and means 68 for algebraically summing the input signal 61 and the limit signal 67. The output of the summing means 68 is connected to a non-inverting amplifier 69 whose output is representative of the sum of the signals 61 and 67 and is the control signal $F_\epsilon$.

The beta monitor 62 is suitably constructed and arranged to produce an angle feedback signal whose magnitude varies with the predicted magnitude of β for each consecutive firing signal that will in turn effect the next valve firing in numerical sequence. For this purpose the monitor that is the subject matter of my co-pending U.S. patent application Ser. No. 382,016 filed on July 23, 1973, and assigned to the General Electric Co. is well suited. Such a monitor utilizes the inputs indicated schematically in the drawings and responds thereto with both high steadystate accuracy and fast transient response to produce an angle feedback signal 63 having relatively negative polarity and a magnitude that is a measure of β. The clamp 64 will influence the control signal $F_\epsilon$ as a function of any deviation of this angle feedback signal 63 beyond the respective minimum and maximum limits 65 and 66, and as a result the frequency of the pulse train 37 is varied as necessary to minimize the excursion of β outside its permissible range. The preset maximum and minimum limits of β are determined by the external run limits 42, and they may be varied or adjusted under certain system conditions. So long as β is within its range of permissible variations, the value of $F_\epsilon$ will vary with the value of the bipolar variable input signal 61, and hence the latter signal controls the valve firing angle.

The control signal $F_\epsilon$ is supplied to a voltage-controlled oscillator comprising a frequency modulated clock 52 operative to procduce the train 37 of output pulses whose frequency f varies with the magnitude of a variable signal $F_c$ which is supplied to the clock. The variable signal $F_c$ is derived by summing means 53 from the algebraic sum of the control signal $F_\epsilon$ and a bias signal $F_b$ of preselected magnitude. As will soon be more fully explained in conjunction with the description of FIG. 3, the oscillator has an integrating characteristic; the time interval that it requires after being periodically recycled before producing its next 1 output is determined by the magnitude of $F_c$. Immediately following the production of each such output, the oscillator is recycled by the feedback signal 38, whereupon its output returns to a 0 state and the integrating process starts over again. The bias signal $F_b$, which is taken from a terminal 54, is appropriately dimensioned to cause the voltage $F_c$ to have the proper magnitude whenever the control signal $F_\epsilon$ is zero to cause the oscillator to run at a predetermined harmonic (e.g., 12th) of the normal fundamental frequency of the a-c network. If desired, a bias signal that varies with the actual fundamental frequency of the network can be used. Under steady state (zero error) conditions, the output of the voltage controlled oscillator will comprise a train 37 of equidistant, discrete pulses whose frequency f is 12 times the alternating voltage frequency.

For reasons to be more fully explained hereinafter, the frequency modulated clock or oscillator 52 has coupled thereto synchronizing means 55 for effectively preventing operation of the oscillator in the absence of a start command RD. The synchronizing means 55, once activated by receipt of the start command, allows the associated oscillator to start producing discrete pulses in response to the first occurrence after such activation of a predetermined reference point which recurs in each cycle of alternating voltage. The predetermined reference point is marked by a periodic timing signal A5 derived from the alternating voltage network by the a-c system monitor 40 (FIG. 1) which applies this signal to a terminal 56. Preferably the a-c system monitor 40 is suitably arranged to derive an array of six cyclic reference signals synchronized with the respective voltages across the three a-c conductors 11A, 11B, 11C (i.e., the commutating voltages of the respective valves of the bridge 10), and to supply to the oscillator 52, via a terminal 57, an additional signal AF which is used to prevent operation of the oscillator in the absence of a valid array of these reference signals.

The start command RD is supplied by external controls (not shown) to a terminal 58 where it initially is received as soon as the converter controls are properly energized by d-c supply voltage, the a-c system monitors are functioning correctly, and sufficient redundant circuits and components are in working order to form a viable system. Once the oscillators begin operating in response to receipt of this command, the firing time computer will idle in its beta regulating mode in readiness for a subsequent converter starting process according to the teachings of U.S. Pat. No. 3,648,147—Leete. More will be said about the oscillator starting scheme in connection with the description of FIGS. 4 and 5 hereinafter.

The discrete pulses in the train 37 produced by the oscillator 52 serve as a first input a to a voting logic means 70. As is indicated in FIG. 2, this means is also connected to the previously-mentioned redundant pulse train producing means 29', and the pulse train 39 from the latter means provides a second input b to the voting logic means 70. Two other inputs c and d are served by additional trains of discrete pulses for redundant controls 200. The voting logic means 70 is suitably constructed and arranged to generate at its output a single pulse of relatively short duration each time there is a coincidence of discrete pulses at any two of its inputs. Consequently, so long as at least two of the redundant oscillators are in position, a train of short pulses is issued by the voting logic means at a frequency which is the same as that of the discrete pulses in each of the trains 37, 39, etc. More details of a preferred embodiment of the voting logic means 70 are shown in FIG. 3 which will soon be described.

The short output pulses from the voting logic means 70 are supplied via a line 79 to the distributing means 90. Driven by these pulses, the distributing means 90 is operative cyclically to produce a predetermined sequence of twelve individual firing signals which respectively commence on the generation, in turn, of twelve consecutive short pulses. The next short pulse to issue after the twelfth firing signal commences will trigger a transition in the driven means 80 that causes it to repeat the first firing signal, thereby starting predetermined sequence over again. Any suitable apparatus, such as a 12-stage ring counter or a parallel output shift register, can be used for this purpose.

Each of the firing signals produced by the driven menas 90 is preferably a square-wave pulse of 180° duration. Each firing signal recurs at a frequency of $f/12$, and the spacing between the leading edges of consecutive signals is $1/f$ which normally, under steady state conditions when f is 12 times the fundamental frequency of the alternating voltage of the a-c system, equals one-twelfth of the period of a cycle of alternating voltage, or 30° (system basis). As was previously described, the twelve individual firing signals are grouped into two interleaved families. The first family, for the respective valves of bridge 10, comprises six firing signals 31-36 which the distributing means 90 produces upon being driven by a schedule of first, third, fifth, seventh, ninth, and 11th short pulses from the voting logic means 70 during each cycle of alternating voltage. The second family, for firing the respective valves of the companion bridge 10', comprises the firing signals 31'-36' which the means 90 produces upon being driven by a schedule of second, fourth, sixth, eighth, 10th, and 12th short pulses per cycle.

The periodic short pulses issued by the voting logic means 70 serve a dual purpose. In addition to initiating the next firing signal in the manner described above, each pulse is fed back to each of the redundant oscillators as the feedback signal 38 which simultaneously recycles them all. For the sake of redundancy, all of the components and circuits shown in FIG. 2 inside the broken-line box 100 are duplicated in another set of controls represented by the broken-line box 200. It will be observed that the voting logic means 70 is common to the distributors of both of the controls 100 and 200. Line e represents means for coupling the output pulses of this voting logic means to the redundant controls 200 where they serve both to drive distributing means corresponding to 90 and to recycle redundant oscillators corresponding to 52. The previously described valve firing systems 20 and 20' are each provided with redundant channels which are respectively activated by the independent sets of firing signals that the controls 100 and 200 respectively generate.

The driven means 90 is equipped with suitable means 81 for locking the distributor in a preset pattern in the absence of the start command RD. This can be done, for example, simply by supplying a zero state supervising signal to the reset inputs of selected flip-flops in the bank of flip-flops comprising a shift register. When the start command is received, this supervising signal changes to a high or 1 state to unlock the distributor in readiness to resume its cyclic operation as soon as the oscillators are restarted. Preferably the preset pattern is chosen to coincide with the pattern that normally exists in the distributor after firing valve 6' in bridge 10' but before the firing of valve 1 in bridge 10. Thus when the means 90 is driven by the first short pulse to be generated by the voting logic means 70, following receipt of the start command, the firing signal 31 for valve 1 is the initial one to commence. The next or second pulse issued by the voting logic means causes the driven means 90 to produce the firing signal 31', whereby valve 1' is the initial one fired in the companion bridge 10'.

In its preferred form, the voting logic means 70 includes a two-out-of-four gate and pulse generator. This has been illustrated in FIG. 3 which will now be described. The gate consists of an array of six AND logic circuits 71-76 and a single OR logic circuit 77. Each of the AND circuits has a pair of inputs. The inputs of circuit 71 are arranged to receive the discrete pulses in the trains 37 and 39 which the oscillators 52 and 52' respectively supply the inputs a and b of the voting logic means, and therefore an output signal from this circuit exists during any period of time when the pulses in these two trains coincide or overlap with each other. As can be seen in FIG. 3, the pairs of inputs of the other AND circuits are connected in a similar fashion to different combinations of the four inputs a, b, c, and d of the voting logic means, whereby an output signal from the circuit 72 indicates the contemperaneous presence of discrete pulses at both inputs b and c, an output signal from the circuit 73 indicates the contemperaneous presence of discrete pulses at both inputs c and d, an output signal from the circuit 74 indicates the contemperaneous presence of discrete pulses at both inputs d and a, an output signal from the circuit 75 indicates the contemperaneous presence of discrete pulses at both inputs b and d, and an output signal from the circuit 76 indicates the contemporaneous presence of discrete pulses at both inputs a and c.

As is shown in FIG. 3, the OR logic circuit 77 has six alternative inputs which are respectively connected to the outputs of the six AND circuits 71-76. Consequently an output signal from the OR circuit will exist whenever there is a coincidence of discrete pulses in any two of the four trains that the redundant oscillators supply to the respective inputs a, b, c, and d of the voting logic means 70. Each time this output signal appears, it triggers the pulse generator 78. The pulse generator comprises suitable means, such as a monostable multivibrator, for issuing a single pulse of known short duration (e.g., approximately 10 microseconds) when so triggered. This short pulse drives the distributing means 90 (FIG. 2) to which it is fed via line 79, and it concurrently serves as a feedback signal 38 for simultaneously recycling all of the redundant oscillators to which the inputs of the voting logic means are connected. Recycling the oscillators terminates any and all of the signals which were provided at these inputs. Subseqeuntly, as soon as the next discrete pulses in any two trains are produced, the resulting output signal from the gate once again triggers the pulse generator 78 which issues another short pulse.

It will be observed that the system shown in FIG. 3 is fully redundant. If the integrating or level detecting function is one of the oscillators 52, 52', etc., were to become misaligned with respect to the corresponding function in the other oscillators so that the one improperly produces its output pulses too fast, the voting logic means 70 nevertheless will operate at the proper frequency which is determined by the others. The latter means will continue to generate a train of short pulses even if some of the oscillators were to stop working. If an oscillator fails in its "low" state (i.e., if it stops producing any output pulses), the faster two of the remaining good oscillators will continue to trigger the voting logic means as before. On the other hand, if an oscillator fails in its "high" state (i.e., if its output signal continues unabated), the voting logic circuit will still generate short pulses as before, except that only one discrete pulse from any of the other three oscillators is required.

A preferred embodiment of the frequency modulated oscillator 52 is shown in FIG. 3. It will be seen to comprise an integrator 101, a level detector 102, and separate reset means 103. The integrator 101 consists of a capacitor 104 connected between the collector of a PNP transistor 105 and a reference potential bus 106 (preferably grounded). The transistor 105 controls the charging of the capacitor 104, and the voltage developed across this capacitor is the output signal of the integrator 101. The base of the transistor 105 is biased by a constant potential derived from the juncture of two resistors 107 and 108 which are connected in series with a diode 109 between the reference bus 106 and a d-c supply voltage bus of relatively positive potential (e.g., +15 volts). The emitter of the transistor is coupled to the +15V bus via a resistor 110, and the previously described frequency determining voltage $F_c$ is applied through a resistor 111 to the same emitter. Consequently the collector current of the transistor 105 provides a variable current source for charging the integrating capacitor 104 at a rate which depends on $F_c$. In other words the output signal of the integrator 101 increases at a rate which is determined by the magnitude of the variable signal $F_c$, and its magnitude is proportional to the time integral of this signal. In effect the integrator generates a linear voltage ramp whose slope is proportional to $F_c$.

The level detector 102 preferably comprises an amplifier 112 connected in a differential mode. The non-inverting input 113 of this amplifier is coupled by means of an isolating diode 114 to the positive plate of the integrating capacitor 104. A positive bias potential is applied to the other input of the amplifier 112 by means of a voltage divider comprising resistors 115 and 116 connected in series with the resistor 108 between +15V bus and the reference bus 106. The function of the differential amplifier 112 is to compare the rising voltage across the integrating capacitor 104 with the known magnitude of the bias voltage across the resistor 116 and to switch from a 0 to a 1 output state each time the former voltage attains a predetermined threshold level which is equal to the latter. Successive output signals formed by the level detector in this manner comprise the pulse train 37 previously described. If for any reason unequal spacings between consecutive pulses were desired, suitable means (not shown) could be provided for programming the bias voltage so that from time to time it is appropriately increased and decreased with respect to a normal constant magnitude to which the average magnitude of the bias voltage will remain equal over a full cycle of operation (system basis). In this convenient manner the relative firing angles at which the various valves of the converter are fired can be separately perturbed or modulated as desired.

Periodically the oscillator is recycled by the reset means 103 in response to the feedback signal 38. The reset means 103 comprises an NPN transistor 117 associated with the integrator 101. This transistor has a collector connected directly to the positive plate of the integrating capacitor 104 and an emitter connected directly to the reference bus 106. The feedback signal 38 is applied through a resistor 118 to the base of the transistor 117 which it causes to turn on just long enough to discharge the capacitor 104, thereby abruptly reducing the magnitude of the integrator output signal to substantially zero. As soon as the capacitor voltage drops below the aforesaid threshold level, the level detector 102 reverts to a 0 state thereby terminating its output pulse. This brief resetting operation takes place concurrently with the generation of each short pulse by the voting logic means 70, and on the expiration of the feedback signal 38 the transistor 117 resumes its non-conducting state which permits the collector current of the transistor 105 to once again charge up the integrating capacitor 104. Thus the integrator output signal has a sawtooth wave form.

So long as the magnitude of $F_c$ is normal, the magnitude of the collector current of the transistor 105 will be such that the time interval required by the capacitor 104 to charge from zero to the normal threshold level of the voltage to which the level detector 102 responds to substantially onetwelfth of the period of one cycle of alternating voltage, or 30° (system basis). If the magnitude of $F_c$ were higher than normal, the rate at which the capacitor charges is correspondingly increased and the next output pulse from the level detector will be produced more quickly, thereby increasing the pulse frequency of the train 37 of discrete output pulses. On the other hand, if $F_c$ were lower than normal, the charging rate is correspondingly reduced and the oscillator requires a longer time to produce the succeeding pulse after each recycling, thereby decreasing the pulse frequency.

At the same time the oscillator 52 is recycled by a feedback signal 38, all of the redundant oscillators are simultaneously recycled by the same signal. In FIG. 3 the second one of the redundant oscillators is represented by the dashedline block 52' the components and circuits of which are the same as those shown and described above for the oscillator 52.

In order to facilitate fast restarting of the oscillators following any short duration a-c power outage, each oscillator is provided with means for blocking and unblocking the same under the control of the previously-mentioned synchronizing means. In the embodiment shown in FIG. 3, the blocking means includes a diode 121 whose anode is connected to the input 113 of the differential amplifier 112 and whose cathode is connected to a terminal 122 which is either at zero (ground) potential or at a high positive potential, depending on the state of the synchronizing means 55 whose output is coupled to this terminal (see the description of FIG. 4 below). Whenever the terminal 122 is at zero potential, the diode 121 will conduct to clamp the input of the level detector 102 to nearly ground potential. This prevents operation of the oscillator 52 even though the integrating capacitor 104 is fully charged. At this time the isolating diode 114 between the capacitor 104 and the input of the amplifier 112 will be reverse biased, and the oscillator is in such a state that it can immediately produce an output pulse as soon as the level detector is released as a result of the synchronizing means 55 applying to the terminal 122 a "1" signal which reverse biases the diode 121, thereby unblocking the oscillator.

As was previously mentioned, means is also provided for preventing or blocking operation of each of the oscillators in the absence of a valid array of cyclic reference signals as indicated by the signal AF from the a-c system monitor 40 (FIG. 1). The array of reference signals is used by the beta monitor 62 (FIG. 2) to ensure the steady-state accuracy of the angle feedback signal 63 once the firing signal generator is running. In the illustrated oscillator 52 this alternative blocking means includes a PNP transistor 123 whose base electrode is connected to the terminal 57 to which the signal AF is supplied. The transistor 123 has its emitter connected directly to the +15V bus, and its collector is connected via a diode 124 and a resistor 125 to a second d-c supply voltage bus of relatively negative potential (e.g., −15 volts). Connected to the junction of the diode 124 and the resistor 125 is the cathode of a diode 126 whose anode is connected to the positive input 113 of the amplifier 112 and also, through a resistor 127, to the +15V bus. The resistors 125 and 127 are proportioned so that when the transistor 123 is turned off and current is flowing through both of these resistors via the diode 126 therebetween, the input of the level detector 102 is clamped to nearly ground potential. In this state, which results when the signal AF has a 1 value, the oscillator cannot operate regardless of the level of voltage across its integrating capacitor 104. However, any time AF is 0 (due to the availability of the requisite reference signals), the transistor 123 is on, its collector potential is approximately +15 volts, and the diode 126 is reverse biased and nonconductive, thereby unclamping the level detector 102 and permitting operation of the oscillator unless blocked by the associated synchronizing means 55.

Figure 4:
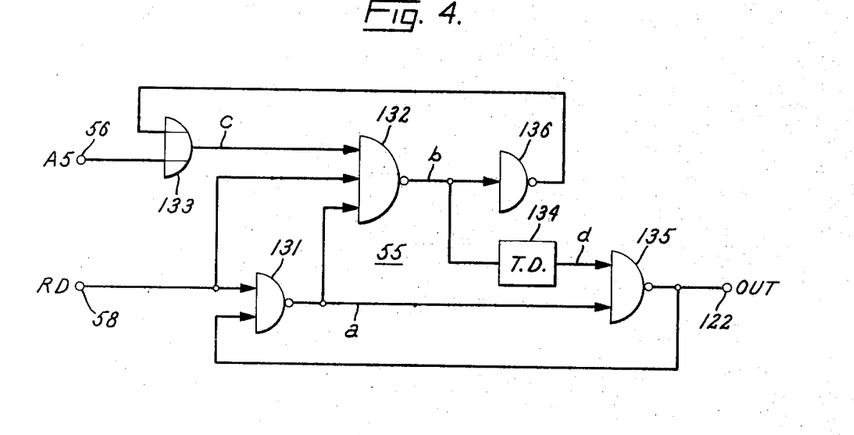
FIG. 4 is a functional block diagram of a preferred embodiment of the synchronizing means shown as a single block in FIG. 2.

In FIG. 4 I have illustrated a preferred embodiment of the synchronizing means 55 for the oscillator 52. As was explained hereinbefore, this synchronizing means receives from the a-c system monitor 40 (FIG. 1) a periodic timing signal A5 of relatively short duration (e.g., approximately 2 milliseconds), and it receives from external controls (not shown) the start command RD. The timing signal A5 recurs periodically at a predetermined reference point in each cycle of alternating voltage. The predetermined reference point preferably coincides with the negative-going zero crossing of the phase C to phase B voltage waveform on the a-c side of the bridge 10. This voltage is the forward anode voltage across valve 5 prior to firing, and it is also the commutating voltage of valve 3 which, when subsequently fired, is the one that will relieve conduction in the initially fired valve 1 of bridge 10. Two complete cycles of this alternating voltage have been illustrated in FIG. 5. In phase with each of its positive half cycles is a corresponding one of the array of periodic reference signals that the monitor 40 derives from the a-c network, and it is the trailing edge of that corresponding signal that marks the appearance of the timing signal A5. It should be noted that this recurrent timing signal A5 will lag by 60° the positive going zero crossing of the phase A to phase C voltage which is the forward anode voltage across valve 1 prior to its firing.

As can be seen in FIG. 4, the start command RD is applied to first and second NAND logic circuits 131 and 132 in the synchronizing means 55. The first of these circuits has a second input to which the output signal of the synchronizing means is fed back. The second NAND circuit 132 has a total of three inputs comprising, respectively, the start command RD, the output $a$ of the first NAND circuit 131 and the output $c$ of an OR logic circuit 133. The output $b$ of the circuit 132 is fed to time delay means 134 whose output $d$ is applied to a third NAND logic circuit 135. The other input of the latter circuit is provided by the output $a$ of the first NAND circuit 131. The circuit 135 produces the output signal (OUT) which the synchronizing means 55 applied to the terminal 122. A latching NAND circuit 136 couples the output $b$ of the second NAND circuit 132 to one of the inputs of the OR circuit 133 whose other input is the timing signal A5.

Figure 5:
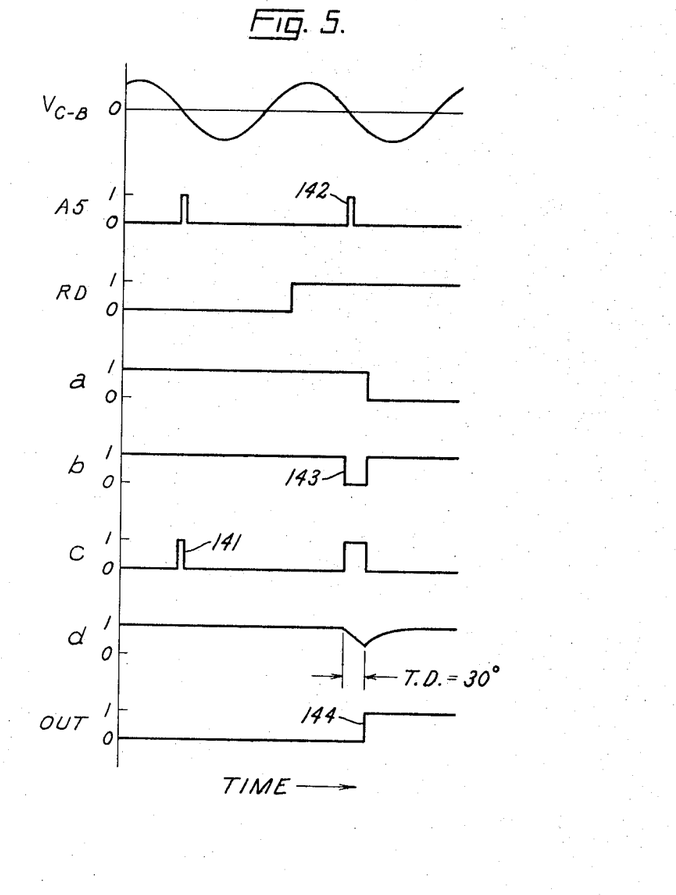
FIG. 5 is a series of charts showing certain electrical quantities plotted agaist time to illustrate the manner of operation of the synchronizing means shown in FIG. 4.

To facilitate an understanding of the operation of the synchronizing means 55, the outputs of its various circuits have been charted in FIG. 5. Initially, in the absence of a start command (RD = 0), the outputs $a$, $b$, and $d$ are all in high (1) states, and the output signal of the synchronizing means is consequently 0 (ground potential). As a result, in the oscillator 52 (FIG. 3) the diode 121 blocks the formation of any discrete pulse by the level detector 102 regardless of the magnitude of the output signal of the integrator 101. On receipt of the periodic timing signal A5, the output $c$ of the OR circuit 133 in the synchronizing means momentarily switches from a 0 to a 1 state as is indicated at 141 (FIG. 5), but the NAND circuit 132 cannot change states because RD is still 0.

To activate the synchronizing means, a start command (RD = 1) must first be received by the NAND circuit 132. Following such an event, the first occurrence 142 of a timing signal A5 results in the circuit 132 having three concurrent 1 inputs, and as indicated at 143 in FIG. 5 its output $b$ abruptly switches to 0. (So long as $b$ remains 0, $c$ remains 1 through the action of the latching circuit 136.) In delayed response to this state change of the circuit 132, the NAND circuit 135 effects a change in OUT from 0 to 1. Preferably the amount of delay, which is introduced by the time delay circuit 134 whose output $d$ slowly decays toward 0 after $b$ switches to 0, corresponds to approximately one-twelfth of a cycle of alternating voltage, or 30° (system basis). On the expiration of this time delay, as is indicated at 144 in FIG. 5, the output signal of the synchronizing means switches to 1, whereupon the diode 121 in the oscillator 52 is disabled (reverse biased) to unblock the level detector 102 which immediately produces a discrete output pulse. At the same time the output signal of the synchronizing means is fed back to the NAND circuit 131 which now has two concurrent 1 inputs, and the output $a$ of this circuit consequently switches to 0 in which state it will remain so long as the start command RD continues to be present at the terminal 58. While $a$ is 0, the output $b$ of the NAND circuit 132 is 1, and consequently the output $d$ of the time delay circuit 134 will return to a 1. Thereafter the signal at the output terminal 122 of the synchronizing means will remain 1 until $a$ reverts to its 1 state due to termination of the start command RD.

As was previously explained, the first discrete pulse produced by the oscillators after receipt of the start command causes the distributor means 90 (FIG. 3) to produce an initial firing signal 31 for valve 1 in the bridge 10, and consequently the initial firing signal is characterized by a firing angle of approximately 90°. That is, the aforesaid 60° lag of A5 plus the 30° delay introduced by the circuit 134 add up to an angle of 90° which would be the firing angle of valve 1 if it were actually fired by the valve firing system 20 when activated by the initial firing signal 31.

The synchronizing means for the duplicate oscillator 52' is similar to the one shown in FIG. 4 and operates in unison therewith. However, the time delay circuit 134 is omitted in the redundant synchronizing means. The input terminal 56' of the redundant synchronizing means receives from the a-c system monitor a periodic timing signal A5' which coincides approximately with the negative going zero crossing of the line 11C' to line 11B' voltage waveform on the a-c side of the second bridge 10', which voltage is also the commutating voltage of valve 3' which, when fired, will relieve conduction in the valve 1' associated with the initial firing signal 31' in the second family of firing signals 31'–36'. Since this voltage lags the alternating voltage shown in FIG. 5 by 30° (system basis), the timing signal A5' occurs 30° after the timing signal A5 and the additional 30° delay that the circuit 134 introduces the synchronizing means 55 is superfluous in the redundant synchronizing means. Once the oscillators 52 and 52' have been unblocked by their respectively associated synchronizing means, each of them immediately releases a first discrete pulse which causes the distributor to produce an initial firing signal 31 in the family of firing signals for the valves of bridge 10, and each thereafter produces a second discrete pulse which causes the distributor to produce an initial firing signal 31' for the valves of the second bridge 10'. The latter signal, which is initiated 30° after the firing signal 31, is associated with valve 1' and is characterized by a firing angle of approximately 90°.

While I have shown and described the preferred form of my invention by way of illustration, further modifications will occur to those skilled in the art. I therefore contemplate by the claims which conclude this specification to cover all such modifications as fall within the true spirit and scope of my invention.

What I claim as new and desire to secure by Letters Patent of the United States is:

1. In an electric power delivery system comprising a plurality of controllable electric valves connected in a bridge configuration between two sets of power conductors, at least one of said sets being associated with a polyphase alternating voltage network, improved control means for cyclically firing said valves in a predetermined sequence and at a frequency that can be varied relative to the frequency of said alternating voltage in order to vary the firing angle of the respective valve firings, comprising:
   a. a plurality of frequency modulated oscillators which are respectively operative to produce a plurality of trains of discrete pulses, each of said oscillators having an integrating characteristic and being supplied with a variable signal whose magnitude determines the time interval that the oscillator requires after being periodically recycled before producing its next discrete pulse, the pulse frequency of each of said trains being a predetermined harmonic of the fundamental frequency of said alternating voltage whenever said variable signal has a predetermined normal magnitude;
   b. a distributor responsive to said pulse trains for producing during each cycle of alternating voltage a family of individual firing signals for the respective valves of said bridge, said distributor comprising (i) voting logic means connected to all of said oscillators for generating a single pulse of relatively short duration each time there is a conicidence of distrete pulses from any two of said oscillators and, concurrently with the generation of each short pulse, for issuing a feedback signal for simultaneously recycling all of said oscillators, and (ii) means driven by successive short pulses from said voting logic means for producing said family of individual firing signals in response to a predetermined schedule of said short pulses; and
   c. means activated by the individual firing signals of said family for firing said valves in sequence.

2. The improved control means of claim 1 in which there are at least three oscillators.

3. The improved control means of claim 1 in which there are six valves in said bridge, said predetermined harmonic is the 12th harmonic, and said predetermined schedule comprises alternate ones of the succession of short pulses.

4. In an electric power delivery system comprising 12 electric valves connected between two sets of power conductors at least one of which sets is associated with a polyphase alternating voltage network, half of said valves being arranged in a first six-pulse bridge configuration and the other half of said valves being arranged in a second six-pulse bridge configuration whose d-c terminals are connected in series with the d-c terminals of the first bridge and whose alternating voltage connections are phase-displaced 30 electrical degrees with respect to those of the first bridge, the improved control means set forth in claim 1 wherein said predetermined harmonic is the 12th harmonic, said distributor produces a first family of six individual firing signals for the respective valves of said first bridge and a second family of six individual firing signals for the respective valves of said second bridge, and wherein the means driven by successive short pulses is arranged to produce the respective firing signals of said first family upon being driven by a schedule of first, third, fifth, seventh, ninth, and 11th short pulses and to produce the respective firing signals of said second family upon being driven by a schedule of second, fourth, sixth, eighth, tenth, and 12th short pulses each cycle of alternating voltage.

5. The improved control means of claim 1 in which each of said oscillators comprises:
   a. an integrator responsive to said variable signal for developing an output signal whose magnitude increases with the time integral of said variable signal,
   b. reset means associated with said integrator and operative periodically in response to said feedback signal to reduce the magnitude of said output signal to substantially zero, thereby recycling the oscillator, and
   c. a level detector having an input connected to said integrator and an oupput at which a discrete pulse is produced each time the magnitude of the output signal of said integrator attains a predetermined level.

6. The improved control means of claim 1 further comprising a plurality of synchronizing means coupled to the respective oscillators and to said one set of conductors for effectively preventing operation of the oscillators in the absence of a start command, each of said synchronizing means being activated on receipt of said start command to allow the associated oscillator to start producing discrete pulses in response to the first occurrence after such activation of a predetermined reference point which recurs in each cycle of alternating voltage.

7. The improved control means of claim 6 in which said distributor includes means for locking said short-pulse driven means in a preset pattern in the absence of said start command so that following activation of said synchronizing means the first pulse generated by said voting logic means will cause said driven means to produce an initial firing signal for a predetermined one of said valves.

8. In combination:
a. a plurality of frequency modulated oscillators which are respectively operative to produce a plurality of trains of discrete pulses, each of said oscillators comprising (i) an integrator responsive to a variable signal for developing an output signal whose magnitude increases with the time integral of said variable signal, whereby the magnitude of the variable signal determines the rate of increase of said output signal, (ii) a level detector having an input connected to said integrator and an output at which a discrete pulse if produced each time the magnitude of the output signal of said integrator attains a predetermined level, and (iii) reset means associated with said integrator and responsive to a feedback signal for periodically reducing the magnitude of the integrator output signal to substantially zero, thereby recycling the oscillator, each of said trains having a pulse frequency of $f$ Hertz which varies with the magnitude of said variable signal; and
b. voting logic means connected to all of said oscillators for generating a single pulse of relatively short duration each time there is a coincidence of discrete pulses from any two of said oscillators and, concurrently with the generation of each short pulse, for issuing a feedback signal for simultaneously recycling all of said oscillators.

9. The combination of claim 8 further including means driven by successive short pulses from said voting logic means for cyclically producing a sequence of $N$ individual signals each of which recurs at a frequency of $f/N$ Hertz.

10. The combination of claim 9 in which there are four oscillators and $N$ is equal to 12.

11. In an electric power delivery system comprising a plurality of periodically conducting controllable electric valves connected between two sets of power conductors, at least one of said sets being associated with a polyphase alternating voltage network, improved control means for cyclically firing said valves in a predetermined sequence and at a frequency that can be varied relative to the frequency of said alternating voltage in order to vary the firing angle of the respective valve firings, comprising:
a. an oscillator operative to produce a train of discrete pulses whose frequency depends on the magnitude of a variable signal supplied thereto, said pulse frequency being a predetermined harmonic of the fundamental frequency of said alternating voltage whenever said variable signal has a predetermined normal magnitude;
b. a distributor responsive to said pulse train for producing during each cycle of alternating voltage a family of individual signals for the respective valves of said system, each firing signal recurring at said fundamental frequency so long as the pulses in said train have said predetermined harmonic frequency;
c. means activated by the individual firing signals of said family for firing said valves in sequence; and
d. synchronizing means coupled to said one set of conductors and to said oscillator for effectively preventing operation of the oscillator in the absence of a start command, said synchronizing means being activated on receipt of said start command to allow said oscillator to start producing discrete pulses in response to the first occurrence after such activation of a predetermined reference point which recurs in each cycle of alternating voltage.

12. The improved control means of claim 11 in which said distributor includes means for locking itself in a preset pattern in the absence of said start command so that following activation of said synchronizing means the first discrete pulse produced by said oscillator will cause said distributor to produce an initial firing signal for a predetermined one of said valves.

13. The improved control means of claim 12 in which said initial firing signal is characterized by a predetermined firing angle.

14. The improved control means of claim 13 in which said predetermined firing angle is approximately 90°.

15. The improved control means of claim 12 in which said predetermined reference point coincides with the negative-going zero crossing of the commutating voltage of the valve which when subsequently fired will relieve conduction in said predetermined one valve.

16. The improved control means of claim 15 wherein said oscillator produces said first discrete pulse on the expiration of a time delay corresponding to approximately one-twelfth of a cycle of alternating voltage following said first occurrence of said negative-going zero crossing.

17. The improved control means of claim 11 for an electric power delivery system comprising six valves interconnected in a six-pulse bridge configuration, wherein said predetermined harmonic is the 12th harmonic and said distributor includes means for locking itself in a preset pattern in the absence of said start command so that following activation of said synchronizing means the second discrete pulse produced by said oscillator will cause said distributor to produce an initial firing signal for a predetermined one of said valves.

18. The improved control means of claim 17 in which the first discrete pulse produced by said oscillator after activation of said synchronizing means coincides approximately with a negative-going zero crossing of the commutating voltage of the valve which when subsequently fired will relieve conduction in said predetermined one valve.

19. The improved control means of claim 11 further comprising means coupled to said one set of conductors for deriving an array of cyclic reference signals synchronized with the voltages of said polyphase network, the said predetermined reference point coinciding with the trailing edge of a predetermined one of said reference signals, and wherein additional means is provided for preventing operation of said oscillator in the absence of a valid array of said reference signals.

20. In an electric power delivery system comprising a plurality of periodically conducting controllable electric valves connected between two sets of power conductors, at least one of said sets being associated with a polyphase alternating voltage network, improved control means for cyclically firing said valves in a predetermined sequence and at a frequency that can be varied relative to the frequency of said alternating voltage in order to vary the firing angle of the respective valve firings, comprising:

a. a frequency modulated oscillator operative to produce a train of discrete pulses, said oscillator comprising (i) an integrator responsive to a variable signal for developing an output signal whose magnitude increases with the time integral of said variable signal, whereby the magnitude of the variable signal determines the rate of increase of said output signal, (ii) a level detector having an input connected to said integrator and an output at which a discrete pulse is formed each time the magnitude of the output signal of said integrator attains a predetermined level, and (iii) reset means associated with said integrator and responsive to a feedback signal for periodically reducing the magnitude of the integrator output signal to substantially zero, thereby recycling the oscillator, the frequency of said discrete pulses being a predetermined harmonic of the fundamental frequency of said alternating voltage whenever said variable signal has a predetermined normal magnitude;

b. a distributor responsive to said pulse train for producing during each cycle of alternating voltage a family of individual firing signals for the respective valves of said system, each firing signal recurring at said fundamental frequency so long as the pulses in said train have said predetermined harmonic frequency, said distributor for being arranged periodically to issue said feedback signal for recycling said oscillator concurrently with the commencement of each firing signal;

c. means activated by the individual firing signals of said family for firing said valves in sequence; and d. synchronizing means coupled to said one set of conductors and to said oscillator for effectively preventing operation of the oscillator in the absence of a start command, said synchronizing means being activated on receipt of said start command to allow said oscillator to start producing discrete pulses in response to the first occurrence after such activation of a predetermined reference point which recurs in each cycle of alternating voltage.

21. The improved control means of claim 20 in which said synchronizing means comprises a. means for blocking the formation of any discrete pulse by said level detector, regardless of the magnitude of the integrator output signal, until disabled, and b. means acvitated on receipt of said start command for disabling said blocking means in response to the first occurrence after such activation of said predetermined reference point, thereby releasing said level detector for the formation of discrete pulses.

22. In a method of starting a signal generator which comprises an oscillator operative at a relatively high frequency $f$ to produce a train of discrete pulses and a distributor responsive thereto for cyclically producing a predetermined sequence of $N$ individual output signals each recurring at a frequency of $f/N$, the steps of:

a. periodically deriving a timing signal of relatively short duration;

b. initially blocking the operation of said oscillator in such a state that it will produce a discrete pulse as soon as unblocked; and c. subsequently unblocking said oscillator in response to the first occurrence of said timing signal after a predetermined start command is received.

23. The method according to claim 22 further including the steps of:

d. initially locking said distributor in a preset pattern in readiness to produce a predetermined one of said N output signals in response to the first discrete pulse from said oscillator once unblocked; and e. subsequently unlocking said oscillator when said start command is received.

* * * * *